O. J. F. JACOBSON.
MAGNETO COUPLING.
APPLICATION FILED MAY 2, 1921.
1,391,777.
Patented Sept. 27, 1921.
2 SHEETS—SHEET 1.
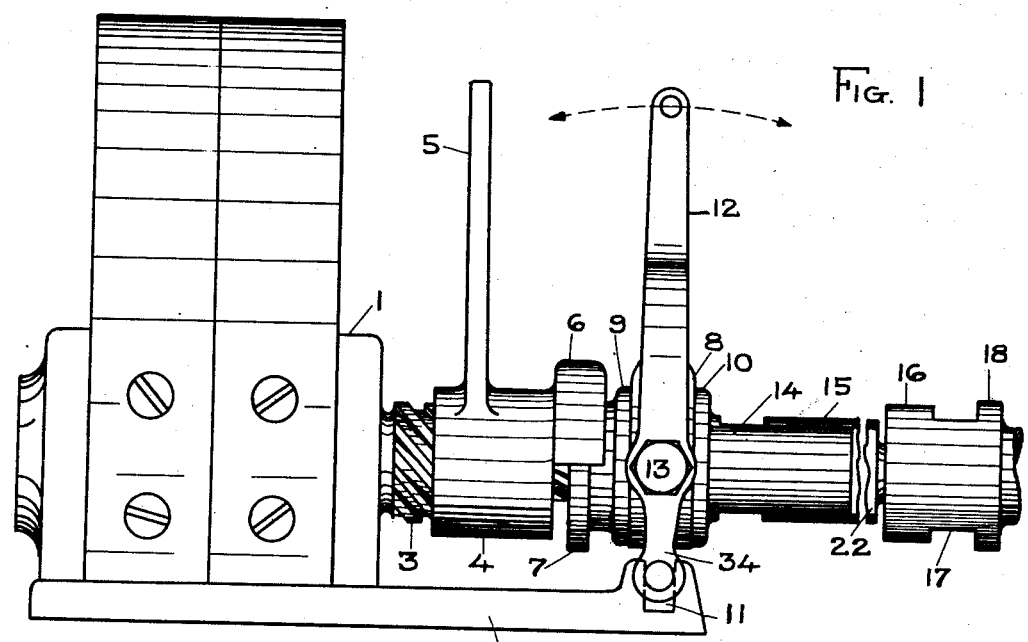
Fig. 1
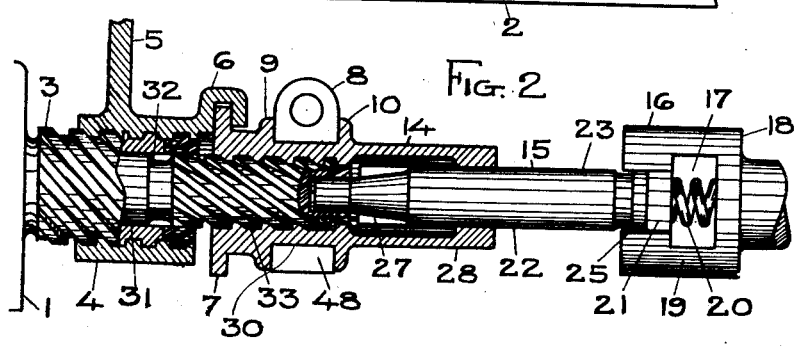
Fig. 2
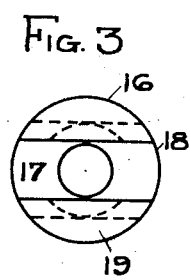
Fig. 3
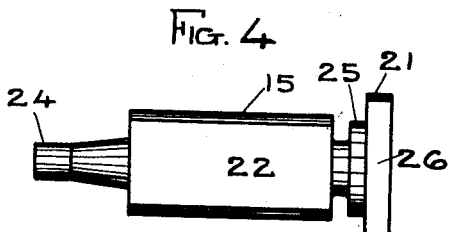
Fig. 4
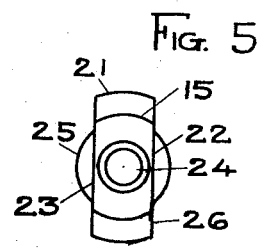
Fig. 5
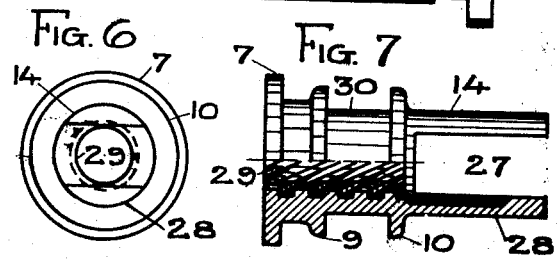
Fig. 6
Fig. 7
INVENTOR.
Oskar J. F. Jacobson
BY Frank Carlson
ATTORNEY.

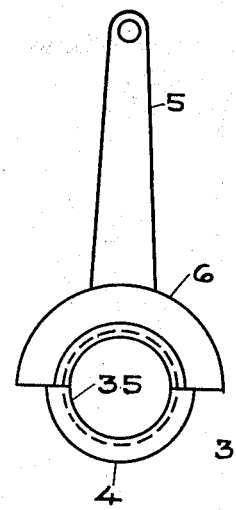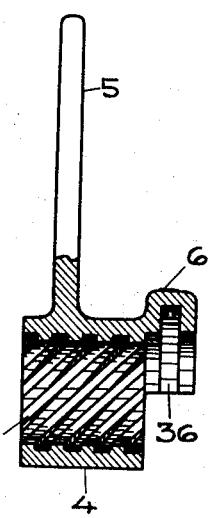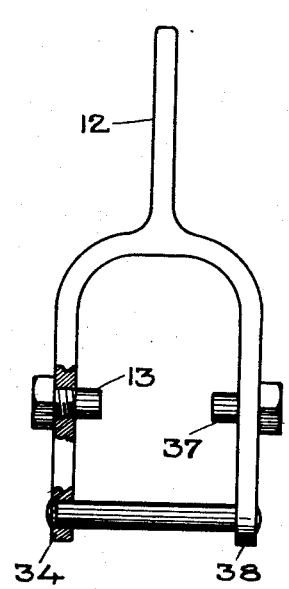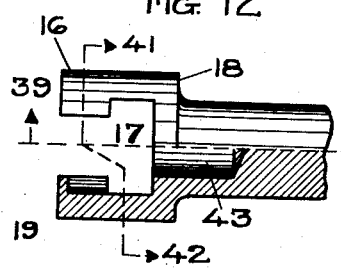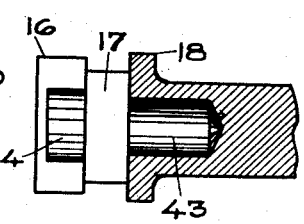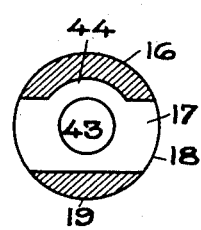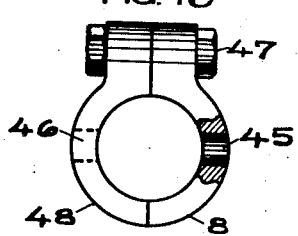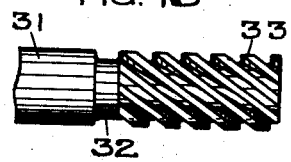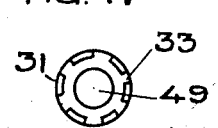

UNITED STATES PATENT OFFICE.

OSKAR J. F. JACOBSON, OF NEW YORK, N. Y.

MAGNETO-COUPLING.

1,391,777.  Specification of Letters Patent.  Patented Sept. 27, 1921.

Application filed May 2, 1921. Serial No. 466,361.

*To all whom it may concern:*

Be it known that I, OSKAR J. F. JACOBSON, a citizen of the United States, and a resident of the borough of Bronx, county of Bronx, city of New York, and State of New York, have invented certain Magneto-Couplings, of which the following is a specification.

This invention relates to magneto couplings, and especially to that class in which either one of a pair of differently movable levers may be used to alter the position of a coupling in order to advance or retard the magneto armature in relation to the engine which operates said magneto.

One advantage of this invention is to have a magneto coupling which may be operated from all four directions by virtue of the two mentioned levers.

Another advantage is to provide a magneto coupling which is very substantial in construction, simple and easy to operate, and very durable by virtue of its very large and extended contact surfaces.

Yet another advantage is to provide a coupling which is easily dismantled and taken apart and likewise reassembled without the use of any tools.

Further advantages will become apparent as this specification proceeds.

In the accompanying drawings,—

Figure 1 is a view of a magneto equipped with a coupling made according to the present invention.

Fig. 2 is another view of the same coupling with some parts in section to disclose the interior construction.

Fig. 3 is an end view of part 18 of Figs. 1 and 2.

Fig. 4 is a view of the key 15 of the first two views.

Fig. 5 is an end view of Fig. 4 looking from the left of the latter view.

Fig. 6 is an end view of the key chuck 14 of the first views.

Fig. 7 is a side view of the same, with a portion in section to expose the interior construction.

Fig. 8 is a view of the member of Figs. 1 and 2 composed of parts 4, 5 and 6.

Fig. 9 is another view of the same in partial section.

Fig. 10 is a view of yoke 12 of Fig. 1.

Fig. 11 is another view of the same.

Fig. 12 is side view of key block 18 shown in the first three views in part section.

Fig. 13 is a horizontal section of Fig. 12 on lines 39 and 40.

Fig. 14 is a section of Fig. 12 on lines 41 and 42.

Fig. 15 is a view of ring 8 shown in Figs. 1 and 2.

Fig. 16 is a view of magneto shaft 31 of Fig. 2.

Fig. 17 is an end view of the same.

Like reference numerals indicate the same parts throughout the views.

It is a well known fact that in automobile engines, the timing of the spark for the explosions must be earlier at high speed than at low because of the appreciable time required for the electrical induction to develop. The means commonly used to accomplish this result include a commutator, which, by being altered by a lever, however, cause the retarding and the advancing to pass the point of maximum output of the magneto.

It is herein proposed to omit any commutator adjustment and instead change the relation of the magneto armature to the motor driving it, and thus receive at all times the maximum spark from the magneto. It is understood, of course, that the magneto is in this case permanently set to spark at the maximum output.

In the practice of my invention, I secure the magneto 1 to a base 2, and thereafter introduce the hereinafter mentioned parts to connect the said magneto to the motor driven shaft 18. The magneto shaft 31 is provided beyond the groove 32 with a steeply threaded portion 33. The magneto is also furnished with an exteriorly threaded bushing 3 on which is screwed a shell 4 whose interior thread 35 engages thread 3, the shell being provided with an arm 5 to rotatably move the same. Any movement of the said arm will, of course, move the shell axially because of the mentioned engaged threads.

The key chuck 30 is provided with a flange 7 which is adapted to seat in the groove 36 within the semi-circular cove 6 on the shell 4, and interiorly with a thread 29 adapted to engage thread 33 of the magneto shaft. Axial movement of the shell 4 caused by rotation of arm 5 will be directly transmitted to the key chuck by contact of its flange with the sides of the shell groove, resulting in a slight rotation of the key chuck because of its mounting thread 33. However, the key chuck is also provided with a pair of jaws 14 and 28, the intervening slot 27 being adapted to receive the key 15, the flat sides 22 and 23 contacting with the inner faces of the jaws to cause the key to rotate with the key chuck. In order to center the key, its inner extremity 24 is adapted to fit in a hole 49 in shaft 31, while its other extremity is provided with an annular flange 25 and beyond this with a projection 21 whose sides are similar to the flat sides 22 and 23 of the body portion 15 of the key as may be seen at 26.

The key block 18 is adapted to receive the last named extremity of the key, as the flat sides like 26 on the projection 21 fit between the jaws 16 and 19, insuring rotation of the key and magneto shaft with key block 18 and its motor driver shaft. It is necessary, however, to properly retain the key in position, a cupped form as at 44 has been given to the interior faces of the block jaws to receive flange 25 of the key. A coil spring 20, visible through slot 17 has likewise been mounted in its recess 43 to stress against the end face of the key to retain the same between the jaws 16 and 19, and the flange 25 in the inner depressions in said jaws.

It will thus be seen that the relation between the motor driven shaft 18 and the magneto shaft 31 can be varied while rotating by simply rotating arm 5 a small distance, the threads and engaged flanges bringing about this desired result, as has been explained. The use of arm 5 implies that the magneto is mounted transversely across the car, so that direct forward and backward movement at the wheel can be transmitted to the arm.

However, it is customary to arrange the magneto axially parallel with the long dimension of a car, and direct reciprocal movement from the wheel would necessitate the setting of a yoke 12 over the parts to operate the parts as follows. The yoke is provided with a pair of legs 34 and 38 which are pivoted in slot 11 of base 2. A pair of flanges 9 and 10 on key chuck 30 are adapted to retain a collar 8 between them, while a pair of studs 13 and 37 in legs 34 and 38 of the yoke 12 project into apertures 45 and 46 in collar 8 respectively. The collar is composed of two duplicate halves 8 and 48 which are held together by a bolt 47.

It will now be seen that if the yoke arm 12 is caused to swing upon its axis in slot 11 the collar 8 will be axially moved by the studs in the legs, and in turn will directly move the key chuck 30 by contact with flanges 9 and 10, producing the same result as before in changing the relation between driving shaft 18 and the magneto shaft 31.

Having thus fully described my invention, I claim:

1. A magneto coupling comprising an extended magneto shaft having a threaded extremity, an exteriorly threaded bushing on said magneto supporting said shaft extension, a drive shaft in alinement with said bushing and extended shaft provided with a transversely slotted head open toward said parts, an interiorly threaded bushing upon said threaded magneto shaft having a flange thereon and provided with a slotted extremity facing said drive shaft head, a key located in said shaft head extending into the slotted portion of said sleeve, and a second sleeve engaging the threads of said magneto bushing, provided with an internal slot engaging the flange of said first sleeve and having a radial arm to turn said second sleeve.

2. A magneto coupling comprising a threaded magneto shaft projecting from an exteriorly threaded bushing, a drive shaft in alinement with said magneto shaft provided with a split head, a key projecting from said head into said magneto shaft, an interiorly threaded sleeve engaging said shaft threads and engaging the sides of said key, a pair of flanges on said sleeve, a lever fulcrumed upon the base of said magneto and having a projection between said sleeve flanges, and a second sleeve engaging aforesaid threaded bushing and one flange upon said first sleeve.

3. A magneto coupling including a threaded magneto shaft projecting from an exteriorly threaded magneto bearing, a sleeve engaging the threads upon said magneto shaft having a plurality of spaced flanges and an extremity portion adapted to engage a drive shaft projection, a lever upon the base of said magneto, a ring upon said sleeve between two of said flanges and a pin from said lever projecting into said ring, a second sleeve engaging the foresaid threaded bushing and one flange upon said first sleeve and a radial arm secured to said second sleeve.

4. A magneto coupling including a threaded magneto shaft extension, an interiorly threaded sleeve engaging said shaft extension provided with a pair of spaced flanges and means adapted to engage a drive shaft, and a lever to move said sleeve axially, provided with a part projecting between said flanges and engaging the same.

5. A magneto coupling including a projecting magneto shaft, a slotted head upon a drive shaft in alinement with said first shaft, a key located in said slotted head and extending to said magneto shaft interior undercut shoulders in the head of said drive shaft, a flange upon said key to seat in said shoulders, and transverse projections upon said key to engage the sides in the slots of said head, there being an axially disposed spring in said head pressing upon the extremity of said key, and a projection upon said key into aforesaid magneto shaft.

Signed at 132 Nassau street, in the borough of Manhattan, county of New York, city and State of New York, this 28th day of April, 1921.

OSKAR J. F. JACOBSON.

Witnesses:
 EDWARD CHILSTROM,
 LILLIE PETERSON.